United States Patent
Schreck et al.

(10) Patent No.: US 7,995,425 B2
(45) Date of Patent: Aug. 9, 2011

(54) POWER CONTROL OF TAMR ELEMENT DURING READ/WRITE TRANSITION

(75) Inventors: Erhard Schreck, San Jose, CA (US); Kowang Liu, Fremont, CA (US); Kouji Shimazawa, Sako (JP); Po-Kang Wang, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 66 days.

(21) Appl. No.: 12/381,327

(22) Filed: Mar. 11, 2009

(65) Prior Publication Data
US 2010/0232050 A1    Sep. 16, 2010

(51) Int. Cl.
*G11B 11/00* (2006.01)
(52) U.S. Cl. ............ 369/13.13; 369/13.33; 360/59
(58) Field of Classification Search .......... 360/59; 369/13.33, 13.32, 13.13, 13.17; 385/129, 385/31, 88–94; 250/201.3, 201.5
See application file for complete search history.

(56) References Cited

U.S. PATENT DOCUMENTS

| | | | |
|---|---|---|---|
| 6,493,183 B1 * | 12/2002 | Kasiraj et al. | 360/125.44 |
| 6,775,103 B2 * | 8/2004 | Kang et al. | 360/236.5 |
| 6,940,691 B2 | 9/2005 | Maat | |
| 7,372,665 B1 | 5/2008 | Stoev et al. | |
| 7,428,124 B1 | 9/2008 | Song et al. | |
| 7,430,098 B1 | 9/2008 | Song et al. | |
| 2003/0099054 A1 * | 5/2003 | Kamijima | 360/59 |
| 2003/0112542 A1 | 6/2003 | Rettner et al. | |
| 2004/0075940 A1 * | 4/2004 | Bajorek et al. | 360/110 |
| 2004/0130820 A1 * | 7/2004 | Ota | 360/128 |
| 2004/0184192 A1 * | 9/2004 | Ota et al. | 360/128 |
| 2004/0252396 A1 | 12/2004 | Pleiss | |
| 2006/0092550 A1 | 5/2006 | Ishii et al. | |
| 2007/0247744 A1 * | 10/2007 | Satoh et al. | 360/75 |
| 2008/0170321 A1 | 7/2008 | Shimozato | |
| 2009/0052092 A1 * | 2/2009 | Zhou et al. | 360/313 |

* cited by examiner

*Primary Examiner* — Tan X Dinh
(74) *Attorney, Agent, or Firm* — Saile Ackerman LLC; Stephen B. Ackerman

(57) ABSTRACT

A slider mounted TAMR (Thermal Assisted Magnetic Recording), DFH (Dynamic Flying Height) type read/write head using optical-laser generated surface plasmons in a small antenna to locally heat a magnetic medium, uses the same optical laser at low power to pre-heat the antenna. Maintaining the antenna at this pre-heated temperature, approximately 50% of its highest temperature during write operations, allows the DFH mechanism sufficient time to compensate for the thermal protrusion of the antenna at that lower temperature, so that thermal protrusion transients are significantly reduced when a writing operation occurs and full laser power is applied. The time constant for antenna protrusion is less than the time constant for DFH fly height compensation, so, without pre-heating, the thermal protrusion of the antenna due to absorption of optical radiation cannot be compensated by the DFH effect.

4 Claims, 4 Drawing Sheets

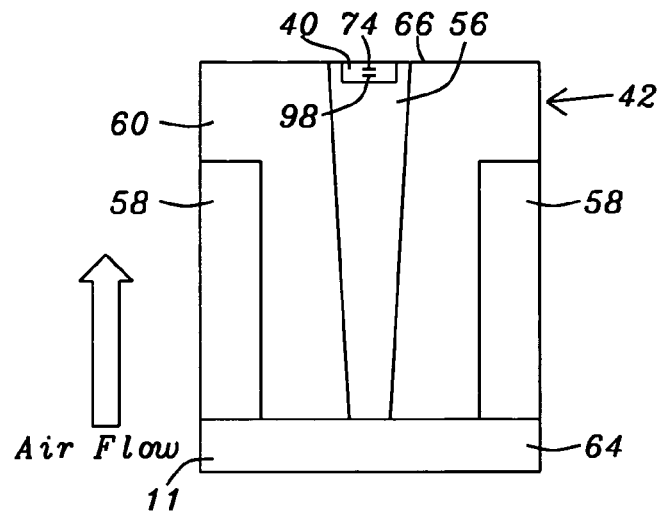
FIG. 1 - Prior Art
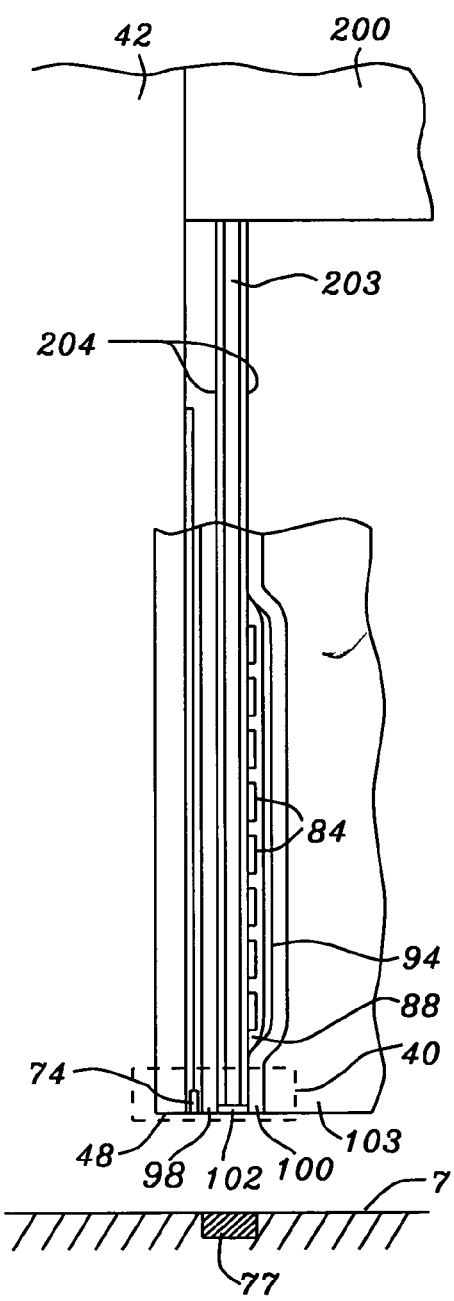
FIG. 2 - Prior Art

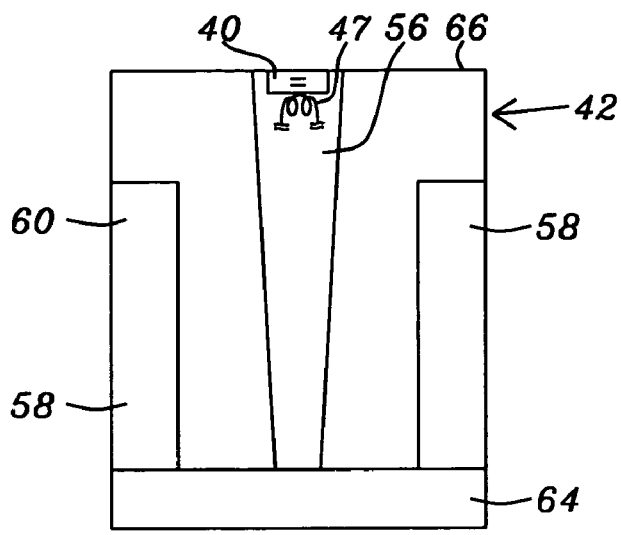
FIG. 3 - Prior Art
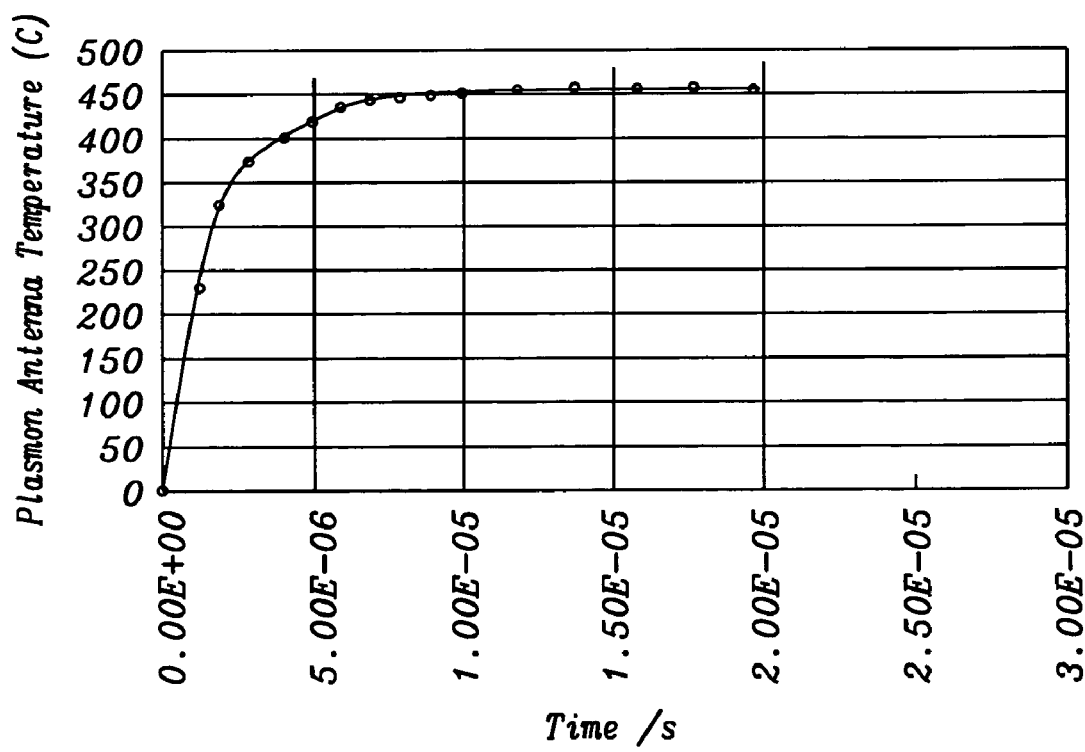
FIG. 4

POWER CONTROL OF TAMR ELEMENT DURING READ/WRITE TRANSITION

BACKGROUND OF THE INVENTION

1. Field of the Invention

This invention relates to the fabrication of magnetic read/write heads that employ dynamic fly height (DFH) to control their aerodynamics and TAMR (thermally assisted magnetic recording) to enable writing on magnetic media having high coercivity and high magnetic anisotropy. More particularly, it relates to a method for controlling thermally induced protrusion of a TAMR plasmon antenna to prevent head/disk interference during hard disk drive (HDD) operation.

2. Description of the Related Art

Magnetic recording at area data densities of between 1 and 10 Tera-bits per $in^2$ (Tbpsi) involves the development of new magnetic recording mediums, new magnetic recording heads and, most importantly, a new magnetic recording scheme that can delay the onset of the so-called "superparamagnetic" effect. This effect is the thermal instability of the extremely small regions on which information must be recorded, in order to achieve the required data densities. A way of circumventing this thermal instability is to use magnetic recording mediums with high magnetic anisotropy and high coercivity that can still be written upon by the increasingly small write heads required for producing the high data density. This way of addressing the problem produces two conflicting requirements: 1. the need for a stronger writing field that is necessitated by the highly anisotropic and coercive magnetic mediums and; 2. the need for a smaller write head of sufficient definition to produce the high areal write densities, which write heads, disadvantageously, produce a smaller field gradient and broader field profile. Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording schemes, notably thermally assisted magnetic recording, or TAMR.

The prior art forms of assisted-recording schemes being applied to the elimination of the above problem share a common feature, which is to pump energy into the magnetic recording system through the use of physical methods that are not directly related to the magnetic field produced by the write head. If such an assisted recording scheme can produce a medium-property profile to enable low-field writing localized at the write field area, high data density recording can be achieved by even a weak write field because of the multiplicative effect of the spatial gradients of both the medium property profile and the write field. These prior art assisted-recording methods either involve deep sub-micron localized heating by an optical beam or ultra-high frequency AC magnetic field generation. The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region. In the following, we will address our attention to a particular implementation of TAMR, namely the transfer of electromagnetic energy to a small, sub-micron sized region of a magnetic medium through interaction with the near field of an optical frequency laser excited surface plasmon. The surface plasmon is excited in a small conducting antenna approximately 200 nm in width that is incorporated within the read/write head structure. The source of optical excitation is a laser diode, also incorporated within the read/write head structure, which directs its beam at the antenna through a means such as an optical waveguide.

Referring first to FIG. 1, there is shown an underside view (looking up from the recording medium) of the air bearing surface (ABS) plane of a ceramic slider (42) in which is contained a read/write head (40) that incorporates a magnetoresistive type read head (42) and an inductive write head (43). Note, the figure shows only the emergent portions of the head in the plane of the ABS. The ABS is not truly planar, but has surface structures, such as a central rail (56), side rails (58) and airflow channels (60) that allow the slider to fly over a rotating disk. The rotation of the disk and resulting airflow direction (shown as an arrow) is into edge (64), called the leading edge of the slider, and away from edge (66), called the trailing edge of the slider. We shall refer below to additional features within the head structure itself and surrounding the head within the slider.

Referring now to FIG. 2, there is shown a schematic illustration of a prior art read/write head, as shown by Rettner et al., U.S. Patent Application 2003/0112542, that includes an exemplary form of thermal-assisted magnetic recording, (TAMR), that could be the subject of the present invention. The head is shown in vertical cross-section, positioned above a magnetic recording medium (7). The active elements of this head that are exposed to the surface of the recording medium, or elements substantially similar in structure, are shown as (40) in FIG. 1 and also schematically indicated as being enclosed within rectangular box labeled (40) in FIG. 2. These elements include a read sensor (74) and the upper (100) and lower (98) pole tips of the inductive write head. Although the figure also shows the inductive coils (84), the upper yoke (94) and insulative filling material (88) of the write head, these structures are not the focus of the present invention.

In this exemplary read/write head, an optical laser diode (shown with no detail) (200) directs a beam of optical frequency electromagnetic radiation (203) through a waveguide (204) and thereupon onto a small region of the ABS surface (48) of the read/write head. This small region, which is substantially between the poles of the write head, contains a small metallic antenna (102), typically of about 200 nm width, which is struck by the laser beam. The laser beam excites a plasmon mode within the antenna surface and because the antenna is close to the medium surface (within an optical wavelength), the electromagnetic near field of the plasmon impinges on a small, sub-micron sized area of the medium (77) and deposits energy at that area to heat it. This region of energy deposition must be no larger in area than a magnetic recording grain, since a larger deposition area could erase information already stored in neighboring grains.

As noted, the energy of the plasmon near field is focused into a sub-micron size optical spot (77) on the recording layer (7) close to the magnetic recording pole-tips (98) and (100), where the magnetic write field profile of the pole-tip overlaps with the optical spot. The optical energy delivered to the recording layer heats up the layer locally to a temperature substantially equal to the Curie temperature, $T_C$, of the recording medium. This temperature rise produces a decrease in the magnetic anisotropy and coercivity of the recording layer material and the magnetization of the recording layer grains becomes more easily switched by the write field. With the optically created thermally modified medium anisotropy profile overlapping with the writer magnetic field profile, the effective write field spatial gradient can be significantly enhanced due to the multiplicative effect of the thermal and magnetic field gradients. Thus, recording can be achieved with the lower magnetic write field of the smaller write head with a resulting higher recording density.

Along with such technology as TAMR to enhance recording on high coercivity media at very high area density, the modern read/write head also incorporates technology, called dynamic fly height, DFH, that allows it to fly very close to a disk surface during disk drive operation, while minimizing the incidence of head/disk interference, such as inadvertent contact between the head and the disk surface. Referring now to schematic (prior art) FIG. 3, there is shown the ABS structure of FIG. 1 further containing a heating element (47) that is adjacent to the read/write head (40). When this heating element is energized, it locally heats the region (40), causing it to protrude relative to the ABS plane. This thermally produced protrusion enables the operational flying height of the slider to be controlled during HDD operation, so that the read and write heads can be lowered relative to the disk surface or raised relative to the disk surface. Since DFH technology is well known in the prior art (including prior art cited below), it will not be discussed further here other than by its incorporation through the cited prior art.

The combination of TAMR technology and DFH technology produces the following problem. As the plasmon antenna heats up due to the absorption of optical energy from the laser, it very quickly protrudes from the surface of the read/write head and approaches the medium surface. In principle, the thermal response of the DFH element can compensate for the antenna protrusion by slightly lifting the head away from the disk surface to increase fly height. However, the time constant for plasma antenna protrusion, $\Theta_{PA}$, is less by a factor between 10 and 50 than the time constant for DFH response, $\Theta_{DFH}$, so the DFH mechanism cannot adequately compensate for the antenna protrusion. This will be discussed with relation to FIG. 5, below. This large difference in response times leads to an antenna protrusion transient during switching between the read/write and write/read condition which can lead to head/disk interference.

The prior art discloses both DFH technology and TAMR technology, as, for example: U.S. Patent Application 2004/0252396 (Pleiss) discloses preheating by applying an electrical current to the write element to reduce pole tip protrusion. U.S. Patent Application 2007/0247744 (Satoh et al) teaches preheating to prevent poor overwriting. U.S. Patent Application 2006/0092550 (Ishii et al) shows preheating a write head to avoid the instability of thermal protrusion. U. S. Published Patent Application 2008/0170321 (Shimozato) discusses preheating of the MR heater. U.S. Pat. Nos. 7,428,124 and 7,430,098 (Song et al) and U.S. Pat. No. 7,372,665 (Stoev et al) propose a variety of heating elements. U.S. Pat. No. 6,940,691 (Maat) shows a TAMR system where heaters induce protrusion of the write head pole tips. U.S. Patent Application 2003/0112542 (Rettner et al) discloses a TAMR including surface plasmon resonance.

None of the above prior art inventions discuss the protrusion transient problem or suggest methods of eliminating it.

SUMMARY OF THE INVENTION

It is the first object of this invention to reduce the transient protrusion of a plasmon antenna in a DFH TAMR read/write head caused by differences between the DFH response time and the rate of antenna protrusion caused by optical radiation absorption heating.

It is the second object of this invention to achieve the first object without appreciably altering the action of the plasmon antenna in transferring an optimum amount of optical energy to an appropriate spot size on the surface of a medium These objects will be achieved by slowly preheating the plasmon antenna to a predetermined temperature of approximately 50% of its final temperature in a time comparable to the reaction time of the compensating DFH mechanism. Preferably, this preheating is accomplished using the same laser that produces the final TAMR effect, except the laser will be operated at a lower power. In this way the plasmon antenna will have an already DFH-compensated pre-existing protrusion and the rate of additional protrusion caused by optical heating at full laser power during write operations will now be reduced to the point where it can be adequately compensated by the DFH mechanism. Thus, a protrusion transient will not occur and the read/write head can switch between read and write operations without the danger of head/disk interference.

The fact that preheating places the plasmon antenna at a higher temperature just prior to writing will not adversely affect (e.g. enlarge) the size of the area on the disk surface to which the antenna transfers thermal energy during plasmon activation. Thus, there will be no unwanted erasures of already written data. This is because of the very small time during which the laser activated plasmon near-field area is active as the antenna passes over the disk surface. In fact, the total accumulated time of spot pre-heating of a 50 nm spot on a disk surface due to plasma antenna pre-heating, during a 5 year writing time span is less than 2 minutes.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic illustration of an ABS portion of a slider in which is seen the emergent portion of read/write head of the type addressed in the present invention.

FIG. 2 schematically shows a vertical cross-section of the read/write head of FIG. 1 now including a TAMR system that utilizes a plasmon antenna for transferring energy to a sub-micron region of a magnetic recording medium.

FIG. 3 shows the ABS emergent portion of the read/write head of FIG. 1 now also including a heating element for DFH fly height compensation.

FIG. 4 is a graphic representation of a plasma antenna temperature profile as a function of time after being struck by optical radiation.

DESCRIPTION OF THE PREFERRED EMBODIMENTS

The preferred embodiment of this invention is a method and device for implementing that method, for reducing the adverse effects of thermally stimulated TAMR plasmon antenna protrusion transients that occur when a DFH read/write head cannot respond quickly enough to compensate for the thermally stimulated antenna protrusion by an increase of the slider ABS fly height. When a plasmon antenna absorbs energy from incident electromagnetic radiation at optical frequencies, it protrudes as a result of thermal expansion with a time constant $\Theta_{PA}$. When the DFH heating element is activated, the slider responds by increasing its fly height with a time constant $\Theta_{DFH}$. Because $\Theta_{DFH} > \Theta_{PA}$, the protrusion of the antenna cannot be compensated quickly enough by the retraction effect produced by the DFH mechanism and there is a brief transient period, shown graphically in FIG. 5 and discussed in greater detail below, during which the antenna protrudes severely enough to cause interference with the recording medium.

Referring to FIG. 4, there is shown a graphical representation of the temperature of an exemplary plasmon antenna as a function of time, from the moment it is thermally excited by absorption of a laser beam of optical frequency. Note that the antenna heats up quickly (approximately $5 \times 10^{-6}$ sec.) to its final temperature $T_{PA/F}$, which is here approximately 450° C. Maximum protrusion also occurs very quickly (as will be seen in FIG. 5), with an exponential time constant $\Theta_{PA}$ and the antenna protrusion then levels off to an equilibrium value at its final temperature $T_{PA/F}$. It should be understood by those skilled in the art that the relationship between the antenna size and the laser power is such as to produce the temperature at the medium surface at which the coercive force and anisotropy are lowered to desired values.

Figure 5:
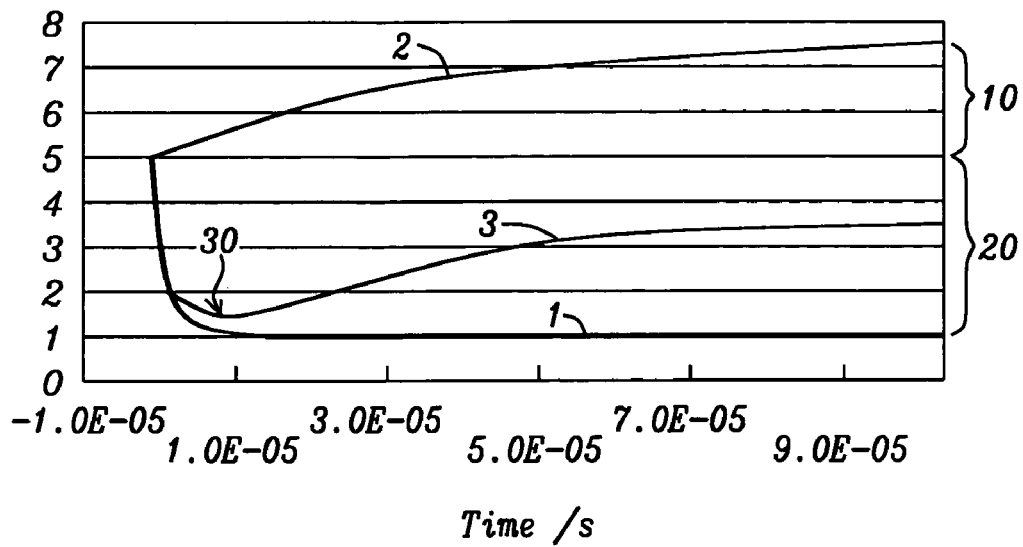
FIG. 5 is a graphical comparison, as a function of time, of the protrusion of a plasmon antenna relative to the read/write head (as in FIG. 4), the retraction of the slider ABS under the action of a compensating DFH and the resulting protrusion of the plasmon antenna relative to a disk surface, showing the net dip of the plasmon antenna.

Referring to FIG. 5, there is shown a graphical overlay of the protrusion of the antenna (1) (as a result of the temperature increase shown in FIG. 4) and the ABS retraction caused by activation of the DFH mechanism (2). As can be seen from the curve showing the combined effects (3), although the equilibrium values of the retraction (10) and protrusion (20) tend to produce a leveling off of the total protrusion, the initial protrusion is not compensated because of the slower time constant of the DFH mechanism, $\Theta_{DFH}$, and a significant transient (35), approximately 90% of the final value, occurs.

According to our experiments and simulations, if the plasmon antenna is pre-heated to approximately 50% of its final temperature, 0.5 $T_{PA/F}$, as subsequently caused by laser beam absorption at full laser power, the effects of its protrusion as it heats up the remaining 50% is significantly reduced and a well controlled distance between the antenna and the surface of the magnetic media is maintained. Preferably, the heating mechanism used for this preheating is the same laser used, at lower power, for the final plasmon antenna excitation. As a result of this preheating, therefore, the transient is reduced by the amount by which the preheated protrusion has already been compensated by the DFH. Thus, if the antenna is heated to 50% of its final temperature, at a rate comparable to the DFH response time, the DFH mechanism can keep up with that portion of the antenna protrusion and the transient will be reduced by a corresponding amount.

Figure 6:
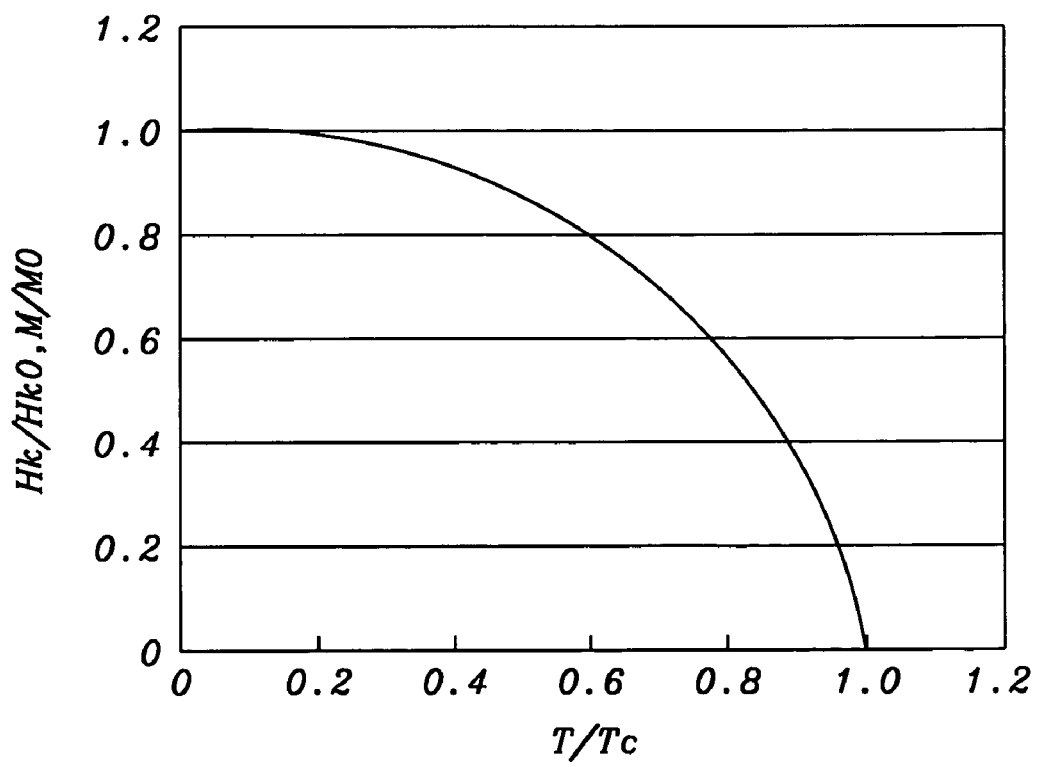
FIG. 6 is a graphical indication of the effect of increasing the temperature, TM of the media, as a fraction of the media Curie temperature, TC, on the normalized media coercivity, i.e. the ratio of media coercivity, $H_k$ to media maximum coercivity, $H_{k0}$.

Referring to FIG. 6, there is shown a graphical illustration of the impact of different media temperatures on the relative coercivity of the media. Thus, the pre-heated antenna will not cause demagnetization of the media by its temperature alone. In fact, pre-heating the antenna to 50% of its final value only decreases relative media coercivity and magnetization by 20%, which is insufficient to have adverse effects. The pre-heated antenna must still be activated by the laser beam to create the plasmon interaction in order for the TAMR effect to result.

Figure 7:
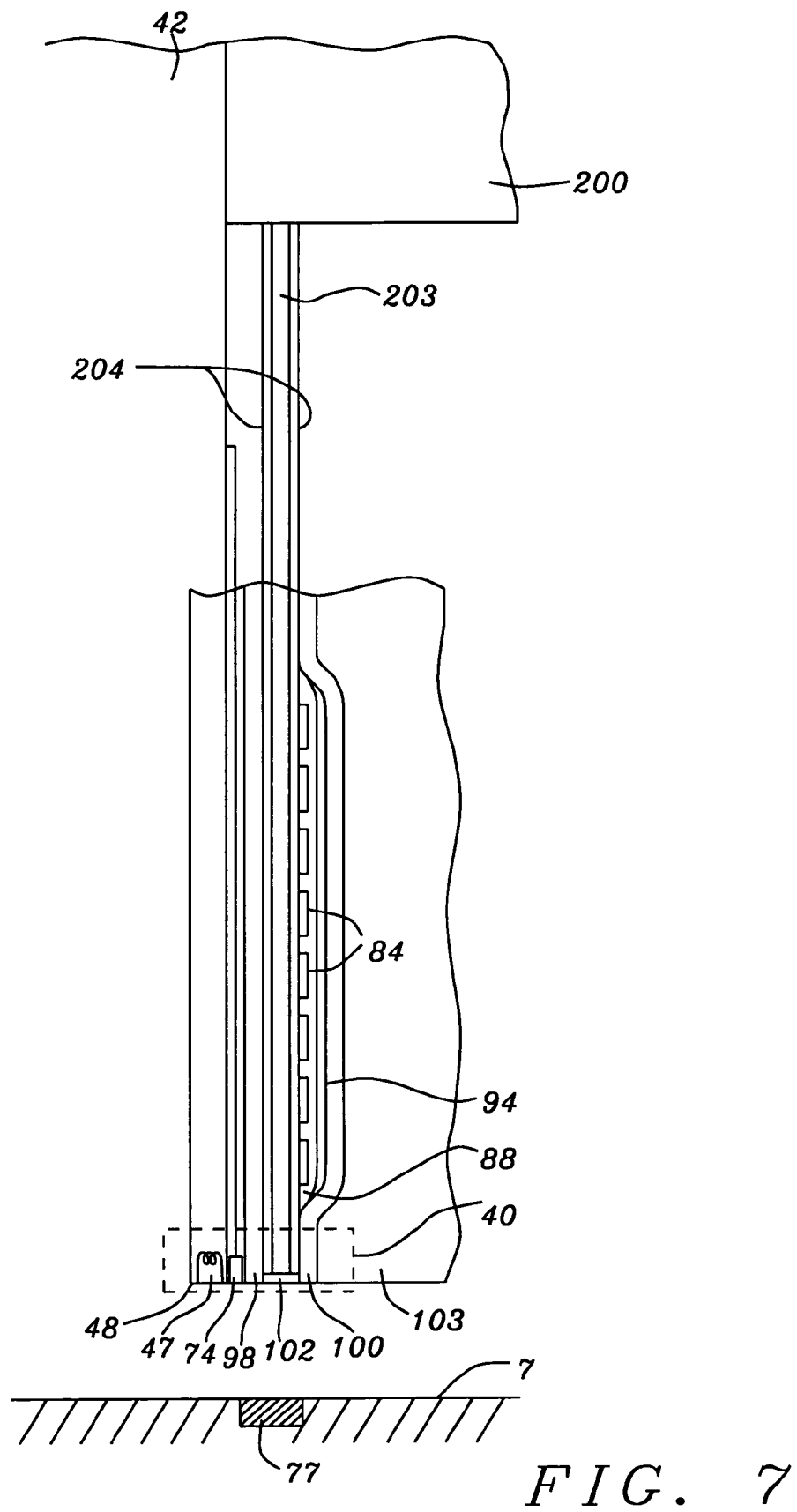
FIG. 7 is a schematic illustration of a read/write head combining the properties of the DHF technology shown in FIG. 3, the TAMR technology of FIG. 2, to which can be applied the preheating method of the present invention.

Referring now to FIG. 7, there is shown a schematic illustration of the exemplary read/write head of prior art FIG. 2 that combines the TAMR technology shown in FIG. 2 with the DFH technology shown in FIG. 3, specifically the heater element (47). It is now understood that in accord with the preferred embodiment of the method of this invention, the same optical laser diode (200) that is used to effect the plasmon near-field heating of the disk surface by heating the plasmon antenna (102) to a final temperature $T_{PA/F}$, will now be used at lower power to preheat and maintain that same antenna (102) at a lesser temperature, approximately 0.5 $T_{PA/F}$. During this preheating, the DFH element (47) can effectively compensate for that portion of the antenna protrusion that results from the preheated temperature so that whenever a final antenna heating occurs to effect a write operation, the protrusion transient will be significantly reduced. It is noted that while it is a great advantage of the present method, in terms of simplicity and efficiency, that the preheating and maintaining of the preheated temperature is accomplished by the same optical laser that generates the surface plasmons, this by no means rules our other mechanisms by which the plasmon antenna could be preheated, such as resistive heaters or auxiliary lasers.

During operation of the HDD and the read/write head, the antenna will be kept at the pre-heated temperature by continued application of the laser at low power. When a write operation is required, optical radiation from the laser diode at full power will impinge upon the preheated antenna, producing surface plasmons in the antenna for the TAMR effect and, in the process, raising the antenna temperature to a final value, $T_{PA/F}$. As this final temperature value is reached, the DFH response will have already compensated for an appreciable portion of the antenna protrusion and the protrusion transient will be reduced by that amount.

As is understood by a person skilled in the art, the preferred embodiments of the present invention are illustrative of the present invention rather than being limiting of the present invention. Revisions and modifications may be made to methods, processes, materials, structures, and dimensions through which is formed and used a slider mounted DFH TAMR read/write head, producing thermal assist effects by means of optical laser-generated surface plasmons in a laser-preheated antenna while having its aerodynamics controlled by a DFH mechanism, while still providing such a slider mounted DFH TAMR read/write head, formed and used in accord with the present invention as defined by the appended claims.

What is claimed is:

1. A device for reading and writing on magnetic media having high coercivity and high anisotropy comprising:
   a slider;
   a read/write head mounted in said slider;
   a DFH mechanism formed in said slider, adjacent to said read/write head, for controlling an operational fly height of said slider;
   a TAMR mechanism for transferring thermal energy to the media during write operations, said TAMR mechanism further comprising:
   a diode laser operating in the optical frequency range at a variety of power levels;
   a plasmon antenna adjacent to said read/write head;
   an optical waveguide for focusing optical radiation produced by said laser onto said antenna, a sufficient power level of such radiation being capable of producing a final temperature of said antenna and a transfer of thermal energy from surface plasmons in said antenna to said magnetic media; and a mechanism for heating said antenna to a predetermined temperature whereby said antenna is preheated to approximately 50% of said final temperature and maintained thereat, said final temperature being the temperature at which said surface plasmons are excited and whereby thermal energy is transferred to said magnetic media.

2. The device of claim 1 wherein said mechanism for heating said antenna to a predetermined temperature is said diode laser.

3. The device of claim 1 wherein said preheated antenna protrudes towards said magnetic media but at a rate wherein said DFH mechanism compensates for said protrusion by adjusting the slider operational fly height to maintain a substantially fixed distance between said antenna and said magnetic media.

4. The device of claim 1 wherein the preheated temperature of said antenna is insufficient to cause erasures of already written data on said magnetic medium.

\* \* \* \* \*

UNITED STATES PATENT AND TRADEMARK OFFICE
CERTIFICATE OF CORRECTION

PATENT NO. : 7,995,425 B2  Page 1 of 1
APPLICATION NO. : 12/381327
DATED : August 9, 2011
INVENTOR(S) : Erhard Schreck et al.

It is certified that error appears in the above-identified patent and that said Letters Patent is hereby corrected as shown below:

Title Page
In the Inventors (75), delete third Inventor "Kouji Shimazawa, Sako (JP)" and replace with
-- Kouji Shimazawa, Saku-shi, (JP) --.

Signed and Sealed this
Twenty-eighth Day of February, 2012

David J. Kappos
*Director of the United States Patent and Trademark Office*